United States Patent [19]
Parker et al.

[11] Patent Number: 6,112,312
[45] Date of Patent: Aug. 29, 2000

[54] METHOD FOR GENERATING FUNCTIONAL TESTS FOR A MICROPROCESSOR HAVING SEVERAL OPERATING MODES AND FEATURES

[75] Inventors: Allan Parker, Austin; Joseph C. Skrovan, Buda, both of Tex.

[73] Assignee: Advanced Micro Devices, Inc., Sunnyvale, Calif.

[21] Appl. No.: 09/037,373

[22] Filed: Mar. 10, 1998

[51] Int. Cl.⁷ .................................................... G06F 11/00
[52] U.S. Cl. ................... 714/32; 714/25; 714/28; 714/30; 714/738; 714/741; 700/79; 700/81; 703/13; 703/14; 703/15; 703/16; 703/21; 703/22; 717/1; 717/2; 717/4; 717/9; 717/10; 717/11
[58] Field of Search ................... 714/32, 28, 25, 714/30, 738, 741; 700/79, 81; 703/13–17, 21, 22; 717/1–11

[56] References Cited

U.S. PATENT DOCUMENTS

| | | |
|---|---|---|
| 4,231,087 | 10/1980 | Hunsberger et al. ................... 364/200 |
| 4,455,654 | 6/1984 | Bhaskar et al. . |
| 4,998,250 | 3/1991 | Kohlmeier et al. . |
| 5,263,149 | 11/1993 | Winlow . |
| 5,321,828 | 6/1994 | Phillips et al. . |
| 5,345,583 | 9/1994 | Davis . |
| 5,465,216 | 11/1995 | Rotem et al. . |
| 5,699,506 | 12/1997 | Phillips et al. ..................... 395/183.13 |
| 5,740,183 | 4/1998 | Lowe . |
| 5,742,502 | 4/1998 | Cherichetti et al. . |
| 5,781,721 | 7/1998 | Hayes et al. ........................ 395/183.18 |
| 5,812,561 | 9/1998 | Giles et al. . |
| 5,867,644 | 2/1999 | Ransom et al. ..................... 395/183.15 |
| 5,940,783 | 8/1999 | Kukutsu et al. ......................... 702/371 |
| 5,943,498 | 8/1999 | Yano et al. .............................. 395/704 |
| 5,954,824 | 9/1999 | Cherichetti et al. ....................... 714/28 |
| 5,956,477 | 9/1999 | Ramson et al. ..................... 395/183.06 |
| 5,958,037 | 9/1999 | Dreyer et al. ............................. 712/32 |

*Primary Examiner*—Ayaz R. Sheikh
*Assistant Examiner*—Firmin Backer
*Attorney, Agent, or Firm*—Kevin L. Daffer; Conley, Rose & Tayon

[57] ABSTRACT

A method is presented for generating functional tests for a microprocessor having several operating modes and features. A test module template file includes a basic set of instructions required to configure the microprocessor to operate in any one of the several operating modes and with any of the several features enabled. A user modifies a copy of the test module template file to form a test module file which provides a desired operating environment and causes the microprocessor to perform a desired activity and to produce a test result. An assembler takes as input the test module file, along with the contents of any library files to be included, and produces both an assembly code list file and a test code file. The assembly code list file is a computer program listing containing assembly language instructions and data. The test code file is intended for execution by: (i) a model of the microprocessor existing within a simulation system, or (ii) a hardware implementation of the microprocessor residing within a computer system. The user specifies at execution time the operating mode of the microprocessor and any features to be enabled via a command line. An expected test result of the desired activity is derived from a functional specification of the microprocessor. The test result is compared to the expected test result in order to determine proper operation of the microprocessor.

21 Claims, 6 Drawing Sheets

METHOD FOR GENERATING FUNCTIONAL TESTS FOR A MICROPROCESSOR HAVING SEVERAL OPERATING MODES AND FEATURES

BACKGROUND OF THE INVENTION

1. Field of the Invention

This invention relates to the manufacture of integrated circuits and more specifically to the functional testing of microprocessors.

2. Description of the Relevant Art

In order to maintain compatibility with the vast amount of existing software developed for previous microprocessor products, many microprocessor manufacturers continue to develop new products which execute the instructions of previous products. Performances of new microprocessors are typically enhanced by the additions of new operating modes and features. The operating mode of a modem microprocessor is typically selected under software control, and each feature of the modem microprocessor is enabled or disabled by system hardware or software. Each allowable combination of operating mode and enabled feature creates a new and different operating environment in which instructions may be executed by the microprocessor. Compared to their predecessors, modern microprocessors have a relatively large number of possible operating environments.

For example, newer x86 microprocessors are designed to maintain software compatibility with previous 80x86 microprocessor generations (e.g., 8086/8, 80286, 80386, and 80486). These newer x86 microprocessors have two primary operating modes called the real-address operating mode (i.e., real operating mode) and the protected operating mode. A third virtual-8086 operating mode (i.e., virtual operating mode) exists within the protected operating mode. In addition, a system management mode allows control over the amount of power dissipated by the microprocessor. Newer x86 microprocessors also have added hardware support for a memory management technique called paging. Paging may be enabled or disabled by system software. Newer x86 microprocessors also have cache memory systems located on the same integrated circuit (i.e., chip) or within the same semiconductor device package. Such on-chip and on-package caches operate under software control, and may be operated in a write-back mode, a write-through mode, or may be disabled. In addition, newer x86 microprocessors have features which allow them to operate in a multiprocessor environment (i.e., an environment in which two or more microprocessors share a common system bus). Thus newer x86 microprocessors may execute x86 instructions in a number of possible operating environments.

Errors in the design of a new microprocessor and defects introduced during manufacturing may cause the microprocessor to produce incorrect results during operation. Functional testing is typically performed to ensure that a microprocessor under test produces correct results in all possible operating environments. Thus with each added feature or operating mode, the task of functionally testing a new microprocessor is made more difficult. Newer x86 microprocessors described above exemplify this situation.

A functional test includes software instructions which cause a microprocessor under test to perform a desired activity and to produce a test result. The test result is compared to an expected test result derived from a functional specification of the microprocessor under test. Any difference between the test result produced by the microprocessor under test and the expected test result represents a failure of the functional test. Such a functional test failure may indicate improper microprocessor operation due to a design error or a manufacturing defect.

A microprocessor carries out a desired activity expressed as machine language code. Machine language code is a series of binary digits (i.e., digital ones and zeros) which represent machine language instructions and data. Assembly language programming allows a user to exert software control over a microprocessor while relieving the user of the need to think in terms of the binary digits of machine language code. As a result, most functional tests are written in assembly language code (i.e., assembly language instructions and data). An assembler is a software program which takes as input a file containing assembly language code, data, and assembler directives and produces a corresponding machine language code file. Execution of a functional test machine language code file causes a microprocessor under test to perform a desired activity and to produce a test result.

Assembly language instructions include instruction mnemonics and associated operands (i.e., identified registers, variable values, or constants). Instruction mnemonics are character strings readily identified with an instruction of a microprocessor instruction set. Examples of x86 microprocessor instruction mnemonics include 'mov', representing the x86 'move data' instruction, and 'jmp', representing the x86 'jump' instruction.

Assembler directives are commands to the assembler concerning input and output, memory organization, and instructions about how to prepare data for program use. Examples of assembler directives are 'include' and 'macro'. The 'include filename' assembler directive directs the assembler to copy the contents of file filename in place of the 'include filename' assembler directive during assembly. The 'name macro' assembler directive associates a following group of software instructions with the symbolic name name. When the assembler encounters macro name name in a file during assembly, it substitutes the group of software instructions in place of name, resulting in in-line insertion of the group of software instructions associated with name into the file being assembled.

In the past, manufactured prototypes of a new microprocessor were required in order to perform functional testing. Today, however, powerful simulation systems exist in which a design of a new microprocessor may be functionally tested (i.e., functionally verified) before prototypes of the new microprocessor are manufactured. Such simulation systems typically include a functional model of a microprocessor under test. Functional testing of a functional model of a microprocessor under test allows design errors to be identified and corrected prior to the manufacture of hardware prototypes.

A substantial amount of the time and effort expended in complete functional testing of a new microprocessor is involved in creating all possible operating environments in which the microprocessor is to perform a desired activity and to produce a test result. It would thus be desirable to have a functional test generation system which consolidates a basic set of instructions required to establish all possible operating environments into a single "template" file. The user may then simply modify a copy of the template file as required and include instructions which cause the microprocessor to perform a desired activity and to produce a test result. It would also be desirable to allow the user to specify a desired operating environment at execution time, thus eliminating the need to modify and re-assemble the template file in order to verify proper operation of the microprocessor in each of the possible operating environments. Further, it would also be desirable to allow a user to select functional test generation for a simulation system, including a model of the microprocessor under test, or for a computer system including a hardware implementation of the microprocessor under test. Such a functional test generation system would increase the efficiency of the functional test generation process and facilitate the dual use of functional tests for design verification and product testing.

SUMMARY OF THE INVENTION

The problems outlined above are in large part solved by a method of generating functional tests for a microprocessor having several operating modes and features. A test module template file of a functional test generation system includes a basic set of instructions required to configure the microprocessor under test to operate in any one of the several operating modes and with any of the several features enabled. A user of the functional test generation system modifies a copy of the test module template file to provide a desired operating environment and to include instructions which cause the microprocessor to perform a desired activity and to produce a test result. The functional test generation system also allows the user to specify at execution time the operating mode of the microprocessor under test and any features to be enabled. The functional test generation system is capable of generating functional tests for execution by a model of the microprocessor under test existing within a simulation system. The functional test generation system is also capable of generating functional tests for execution by a hardware implementation of the microprocessor under test residing within a computer system.

The test module template file includes a setup code portion, a user code portion, and a completion code portion. Each portion of the test module template file includes assembly language instructions, data, and assembler directives (i.e., software instructions). The user modifies the copy of the test module template file by adding, modifying, or deleting software instructions within the test module template file in order to form a test module file. The setup and completion code portions are modified in order to configure the microprocessor to operate in any one of the several operating modes and with any of the several features enabled. The user code portion is modified in order to cause the microprocessor to perform a desired activity and to produce a test result.

An assembler takes as input the test module file, along with the contents of any library files to be included, and produces both an assembly code list file and a test code file. The assembly code list file is a computer program listing which includes assembly language instructions and data. The test code file includes machine language instructions and data, and is intended for: (i) execution by the model of the microprocessor under test existing within the simulation system, or (ii) execution by the hardware implementation of the microprocessor under test residing within the computer system.

The user invokes execution of the test code file by providing a command line to the simulation system or the computer system. The command line includes the name of the test code file and a command line option. The command line option specifies the operating mode of the microprocessor under test to be established during execution, and also specifies any features to be enabled during execution.

An expected test result produced by the desired activity is derived using a functional specification of the microprocessor under test. In order to determine proper operation of the microprocessor under test, the test response produced by the microprocessor under test is compared to the expected test result. The comparison may be performed during or following execution of the test code file.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
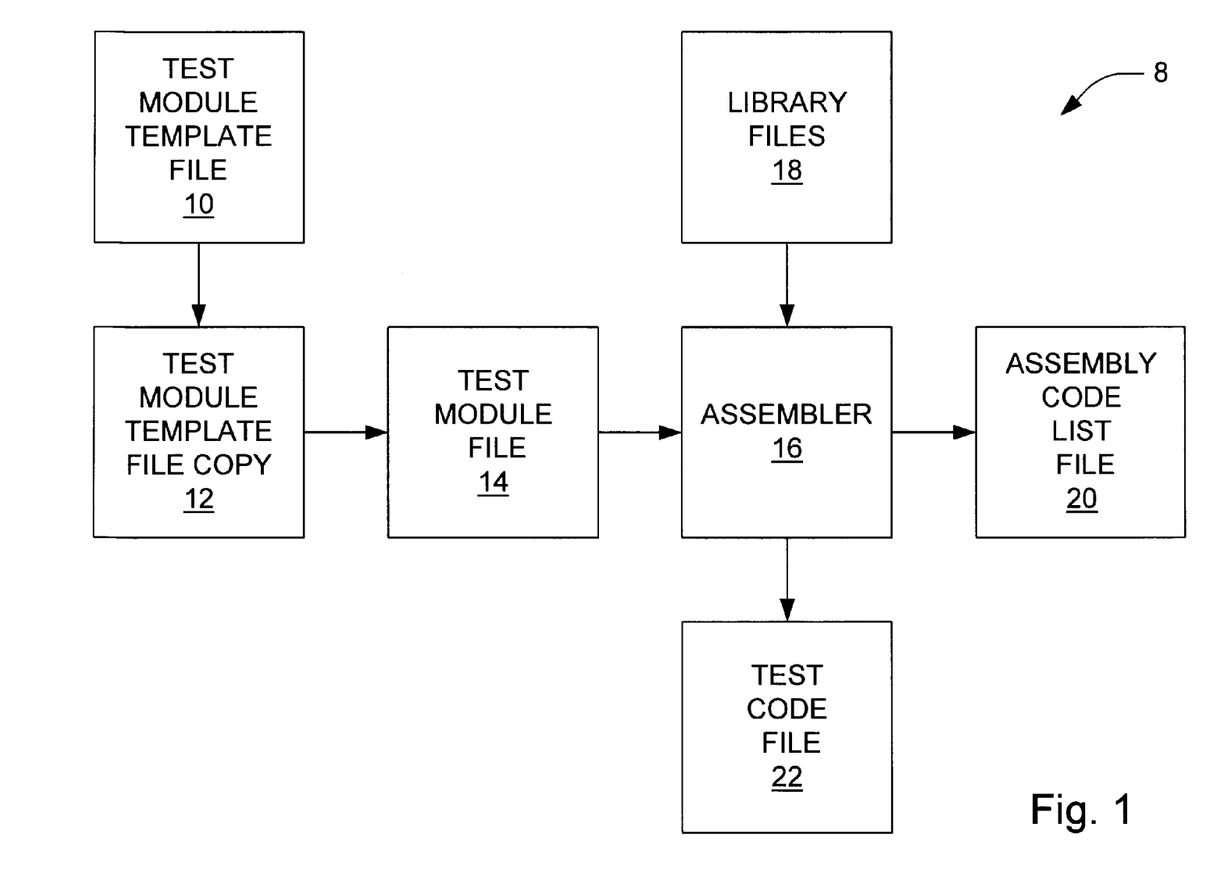
FIG. 1 is a block diagram of a functional test generation system capable of generating both an assembly code list file and a test code file, wherein the test code file is intended for execution by: (i) a model of a microprocessor under test existing within a simulation system, or (ii) a hardware implementation of the microprocessor under test residing within a computer system.

FIG. 1 is a block diagram of a versatile functional test generation system 8 capable of generating functional tests for a simulation system or for a computer system. The simulation system includes a model of the microprocessor under test (i.e., microprocessor model), while the computer system includes a hardware implementation of the microprocessor under test. The microprocessor under test preferably includes several operating modes and features. A test module template file 10 includes a basic set of software instructions required to configure the microprocessor under test to operate in any one of the several operating modes and with any of the several features enabled. As used herein, the term "software instructions" includes assembly language instructions, data, and assembler directives.

In order to preserve test module template file 10, a user first copies test module template file 10 to form an identical test module template file copy 12. The user then modifies test module template file copy 12 by adding, modifying, or deleting software instructions in order to form a test module file 14. Test module file 14 is a complete functional test program which creates a desired operating environment and causes a microprocessor under test to perform a desired activity and to generate a test result.

An assembler 16 of functional test generation system 8 takes as input the contents of test module file 14, includes the contents of any library files 18 according to assembler directives within test module file 14, and produces both an assembly code list file 20 and a test code file 22. Assembly code list file 20 is a computer program listing containing assembly language instructions and data. Test code file 22 contains machine code instructions of the microprocessor under test and data, and is intended for: (i) execution by the microprocessor model within the simulation system, or (ii) execution by the hardware implementation of the microprocessor under test within the computer system.

The microprocessor model may include software instructions which are executed in order to simulate the operations of functional units and subsystems of the microprocessor under test. Alternately, the microprocessor model may use interconnected electronic devices to emulate the operations of the functional units and subsystems. The microprocessor model may thus be implemented in software or hardware and subjected to operational verification. A software implementation of the microprocessor model includes a set of instructions from a defined programming language or a hardware design language. Suitable programming languages include C and C++. Suitable hardware design languages include Verilog and the VHSIC hardware description language (VHDL). A hardware implementation of the microprocessor model may be formed by programming a programmable logic device (PLD) according to a functional specification of the microprocessor to be modeled. Suitable PLDs include various types of programmable logic arrays (PLAs) and field programmable gate arrays (FPGAs).

Assembler 16 produces assembly code list file 20 and test code file 22 during one or more "passes" through test module file 14. For example, during a first pass through test module file 14, assembler 16 may replace 'include' assembler directives with copies of the contents of referenced files, present within library files 18, and expand any calls to defined macros. During a second pass, assembler 16 may expand any remaining macro call statements and produce assembly code list file 20 and test code file 22. A preferred x86 assembler is the Phar Lap 386 ASM Assembler, Phar Lap Software Inc., Cambridge, Mass. Other suitable x86 assemblers include Macro Assembler (MASM) from Microsoft Corp., Redmond, Wash., and Turbo Assembler from Borland International, Inc., Scotts Valley, Calif.

When producing test code file 22, assembler 16 translates assembly language instructions and data (i.e., assembly language code) within input test module file 14 and any included library files 18 into machine language code according to assembler directives. Each machine language instruction is a member of a defined instruction set of the microprocessor under test.

Figure 2:
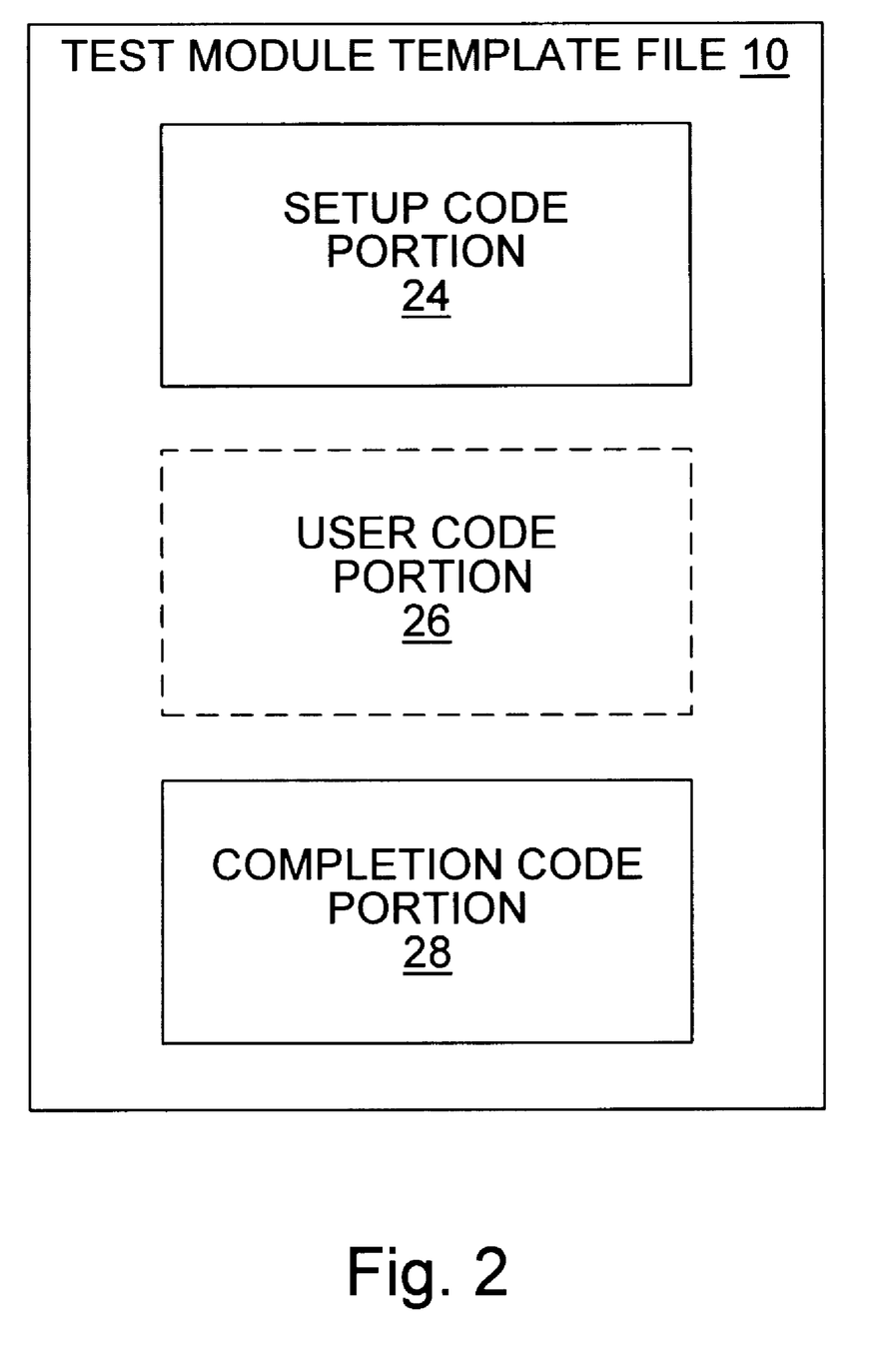
FIG. 2 is a block diagram of a preferred embodiment of a test module template file including a setup code portion, a user code portion, and a completion code portion.

FIG. 2 is a block diagram of a preferred embodiment of test module template file 10. In the embodiment of FIG. 2, test module template file 10 includes a setup code portion 24, a user code portion 26, and a completion code portion 28. All three portions of test module template file 10 include software instructions. During test program generation, the user first copies test module template file 10 to form test module template file copy 12. The user then saves test module template file copy 12 under another name (e.g., 'test.asm'). The user then modifies setup code portion 24 and completion code portion 28 of test module template file copy 12 as required in order to create the desired test execution environment. Such modifications are made by adding, modifying, or deleting software instructions. The user also modifies user code portion 26 by adding, modifying, or deleting software instructions in order to cause the microprocessor under test to perform a desired activity and to generate a test result. If comparison of the test result with the expected test result is to be performed during test program execution, the user also modifies user code portion 26 to include instructions which cause the microprocessor under test to compare the test result to the expected test result, and to produce a message indicative of the result of the comparison. User modification transforms test module template file copy 12 into a complete functional test program, test module file 14.

Test code file 22 is executed in an operating mode according to a command line issued on the appropriate test system. The command line is typically entered by the user via a keyboard. For example, if test module file 14 is named 'test.asm', the default name of the executable test code file 22 produced is 'test.exe'. The command line 'test-pc' contains an implied file name 'test.exe' and a command line option 'pc'. Software instructions included within test module file 14 interpret the command line option to determine the operating mode and features to be enabled during execution of program 'test.exe'. The command line option 'pc' specifies the execution of program 'test.exe' in the protected operating mode (the 'p' portion) with the cache enabled (the 'c' portion). Table 1 below lists command line options and corresponding combinations of operating modes and enabled features. The command line option allows the same 'test.exe' file to be executed in different operating modes and with different features enabled. Without this capability, the 'test.asm' file would have to be modified and re-assembled each time the operating mode or enabled features were changed.

TABLE 1

Command Line Options and Corresponding Operating Modes and Enabled Features.

| Command Line Option | Operating Operating | Enabled Features |
|---|---|---|
| 'r' | Real | (None) |
| 'rc' | Real | Cache |
| 'p' | Protected | (None) |
| 'pc' | Protected | Cache |
| 'pb' | Protected | Cache and Paging |
| 'v' | Virtual | (None) |
| 'vc' | Virtual | Cache |
| 'vb' | Virtual | Cache and Paging |

A working example employing the above described method of generating functional tests for an x86 microprocessor under test will now be described. In this example, the computer system includes a memory system, a disk drive, a keyboard, and operating system software in addition to an x86 microprocessor under test. The simulation system includes a memory system having a loading function, a reset signal generator, and a keyboard in addition to an x86 microprocessor under test. The simulation system has no operating system software. In order to execute test code file 22 on the simulation system or on the computer system, the appropriate file is first loaded into the memory system coupled to the x86 microprocessor under test.

On the computer system, execution of test code file 22 is initiated by entering the appropriate command line via the keyboard. The operating system software first loads test code file 22 from the disk drive into the memory system, then directs the x86 microprocessor under test to begin fetching instructions at a starting address within test code file 22.

On the simulation system, the loading function is used to load test code file 22 into the memory system. The user enters the command line via the keyboard, and the command line is loaded into the memory system using the loading function. Execution of assembly code list file 20 by the x86 microprocessor under test of the simulation system is initiated by assertion of a reset signal coupled to the x86 microprocessor under test by the reset signal generator.

The operating system software provides the computer system with a page translation mechanism and 'boot rom' instructions. The page translation mechanism is used to map linear addresses to physical addresses, and includes a page directory construct and a page table construct located within the memory system. The 'boot rom' instructions direct the x86 microprocessor under test to begin fetching instructions at the starting address within the test code file. As the simulation system has no operating system software, the page translation mechanism and the 'boot rom' instructions must be provided by test code file 22. A programming technique called "conditional assembly" is used within test module file 14 in order to generate the operating system support functions when test code file 22 is to be produced for execution by the simulation system. The resulting 'boot rom' instructions within assembly code list file 20 direct the x86 microprocessor under test to begin fetching instructions at a starting address within assembly code list file 20 following assertion of the reset signal. Generation of the operating system support functions is suppressed when test code file 22 is to be produced for execution by the computer system.

Conditional assembly employs an environment variable which is only active when defined. For example, the user may define an environment variable 'pcshell' within test module template file copy 12 only when test code file 22 is to be executed by the computer system. The user does not define 'pcshell' when assembly code list file 20 is to be generated for the simulation system. As a result, one or more software instructions placed between an 'ifdef pcshell' and an 'endif' assembler directives will be assembled by assembler 16 when generating test code file 22 for execution by the computer system. Similarly, one or more software instructions placed between an 'ifndef pcshell' and an 'endif' assembler directives will not be assembled when generating test code file 22 for execution by the computer system, but will be assembled when generating test code file 22 for execution by the simulation system.

Test module template file copy 12 is modified in order to produce test module file 14 as described above. Test module file 14, used to perform functional testing upon the x86 microprocessor under test, will now be described. A setup code portion of test module file 14 preferably includes:

1) One or more 'include filename' assembler directives which cause a collection of useful macros to be inserted into test module file 14 during the assembly process. These macros are thus available to the user when generating a user code portion described below.
2) Software instructions which cause external interrupt handling mechanisms to be constructed and initialized. Such software instructions define interrupt handler routines, construct an interrupt table containing addresses of (i.e., pointers to) entry points of defined interrupt handler routines, and initialize the addresses within the interrupt table.
3) Software instructions which, if necessary, provide a page translation mechanism. Conditional assembly allows the generation of a paging support only within assembly code list file 20 as described above.
4) An assembler directive which defines a 'base' memory segment beginning at location 0000_0000h within the memory system. Microprocessor initialization instructions begin at offset 0100h within segment 'base'. Operating system software of the computer system causes the x86 microprocessor under test to begin executing test code file 22 at address 0000_0100h. For the simulation system, address 0000_0100h is the target of a far jump instruction executed after a reset signal is asserted. Program instructions begin at address 0000_0100h since the first 256 bytes of the program (from 0000_0000h to 0000_0011h) are reserved for operating system interface information.
5) Assembler directives which allocate and initialize storage locations (i.e., bytes of memory) within memory segment 'base' for a global and at least one local descriptor tables. These tables provide a mechanism for translating virtual addresses to linear addresses in the protected operating mode (80286 and later microprocessors only). Software instructions are inserted by the user in order to generate needed descriptor table entries.
6) Assembler directives which allocate and initialize storage locations within memory segment 'base' for various global variables and pointer variables. Pointer variables contain addresses for jump instructions and table locations.
7) Assembler directives which allocate and initialize storage locations within memory segment 'base' for at least one task state segments. A first task state segment is referred to as 'tss1'. Each task state segment contains information needed to start and manage a separate task (multitasking; 80286 and later microprocessors).
8) An assembler directive which defines, if necessary, a 'page table' memory segment and includes assembler directives which allocate and initialize storage locations within memory segment 'page table' for page table entries. Conditional assembly allows the generation of the page table memory segment and assembly of the related assembler directives only within assembly code list file 20 as described above.
9) An assembler directive which defines a '16 bit test' memory segment and includes software instructions which perform operating mode initialization.

A user code portion of test module file 14 includes software instructions located within the '16 bit test' memory segment. The software instructions cause the x86 microprocessor under test to perform a desired activity and to produce a test result. An expected test result is derived from a functional specification of the x86 microprocessor under test. The test result may be compared to the expected test result during execution of the software instructions of the user code portion. In this case, software instructions which cause the microprocessor under test to produce a message indicative of the result of the comparison are also included in the user code portion. Alternately, the test result may be saved to the memory system for later comparison to the expected test result.

A completion code portion directed to an x86 microprocessor under test preferably includes:

1) An assembler directive which defines a 'first 32 bit test' memory segment. The 'first 32 bit test' memory segment is provided for software instructions of functional tests requiring executions in a 32-bit protected operating mode environment.
2) An assembler directive which defines a 'second 32 bit test' memory segment. The 'second 32 bit test' memory segment is provided for software instructions of functional tests requiring task switching in a 32-bit protected operating mode environment.
3) An assembler directive which defines a 'stack' memory segment. An assembly language statement is used to allocate a number of consecutive storage locations within the 'stack' memory segment to form a stack memory structure.

4) An assembler directive which defines a 'data' memory segment. The 'data' memory segment is provided for data storage. Texts of various messages which may be displayed or printed as a result of test program execution are stored within the 'data' memory segment.

5) An assembler directive which, if necessary, defines a 'boot rom' memory segment having a base address of ffff_0000h. Conditional assembly allows the generation of the 'boot rom' memory segment only within assembly code list file 20 as described above. An 'org 0fff0h' assembler directive immediately preceding a far jump instruction within the defined 'boot rom' segment causes the assembler to place the first byte of the jump instruction at offset fff0h within segment 'boot rom'. The jump instruction thus begins in memory location ffff_fff0h, the location where an x86 microprocessor begins fetching instructions following the assertion of a reset signal. The jump instruction causes the x86 microprocessor under test to begin fetching instructions at memory location 0000_0100h within memory segment 'base' following assertion of the reset signal.

FIGS. 3a–3d make up a flow chart illustrating the flow of control during execution of assembly code list file 20 or test code file 22 during functional testing of the x86 microprocessor under test. It is noted that the indicated flow of control is achieved through the use of conditional assembly directives or conditional branch instructions. During a first step 30 (FIG. 3a), the command line option, stored within the memory system, is interpreted to determine the specified operating mode and features of the x86 microprocessor under test to be enabled during program execution. If test code file 22 is produced for execution by the simulation system, the data segment 'DS' register and the 'GS' segment register of the x86 microprocessor under test are initialized to the base address of (i.e., initialized to point to) the 'base' memory segment during a step 32. If test code file 22 is produced for execution by the computer system, step 32 is not performed as an operating system of the computer system initializes the 'DS' and 'GS' segment registers.

Figure 3A:
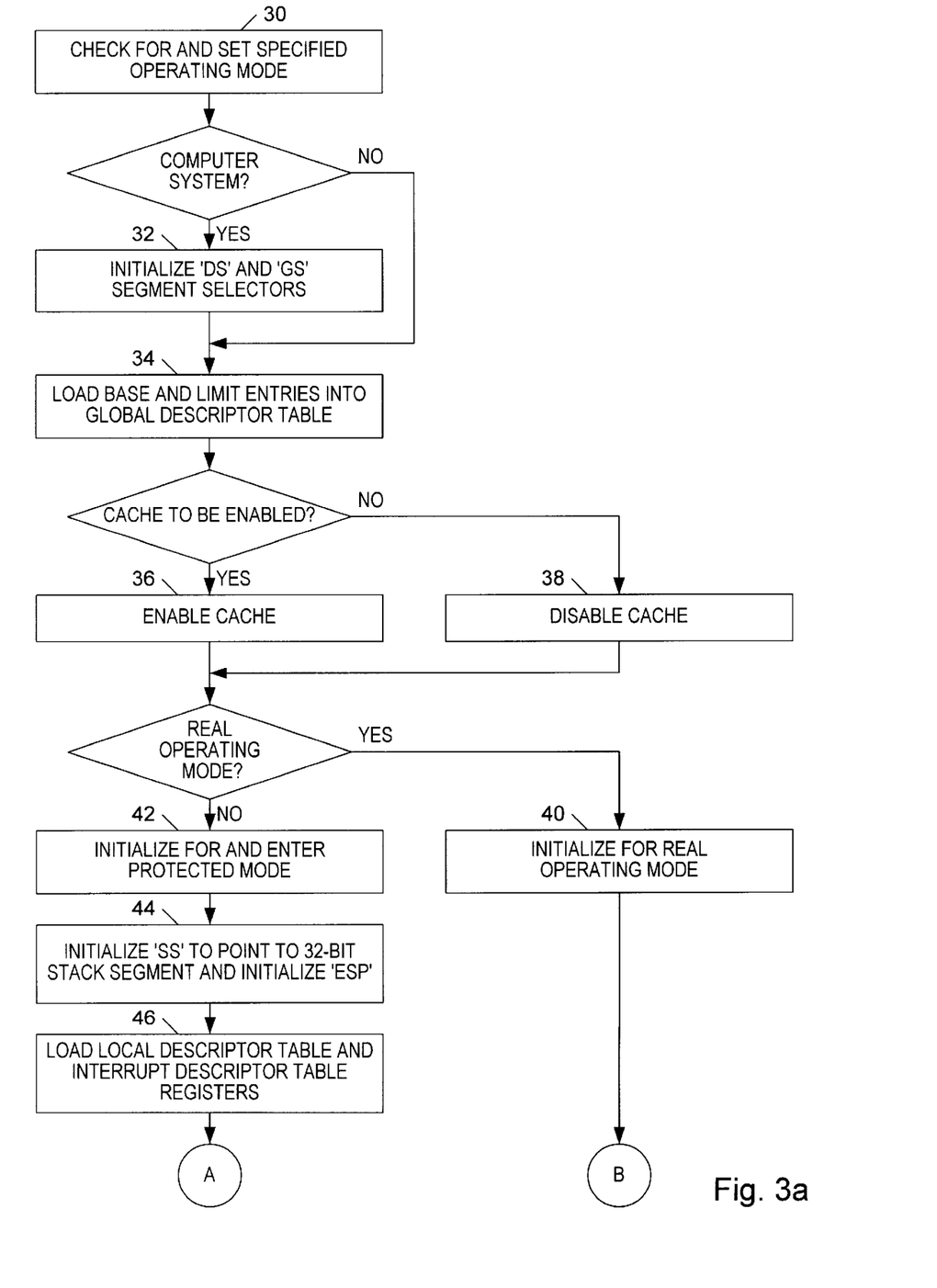
FIGS. 3*a*–3*d* make up a flow chart illustrating the flow of control during execution of the test code file during the functional testing of an x86 microprocessor under test.

The base addresses and limits of defined memory segments are loaded into the global descriptor table during a step 34. If the command line option specifies that a cache memory system of the x86 microprocessor under test is to be enabled during testing, the cache memory system is enabled during a step 36. Otherwise, the cache memory system is disabled during a step 38. If operation of the x86 microprocessor under test in the real operating mode is specified, initialization for operation in the real operating mode continues during a step 40. Otherwise, initialization for operation in the protected operating mode begins during a step 42. During a step 44, the stack segment 'SS' register of the x86 microprocessor under test is initialized to point to a memory segment allocated for a 32-bit stack memory structure, and the 32-bit stack pointer register 'ESP' is initialized to point to the top of the empty stack. The local descriptor table and interrupt descriptor table registers are loaded with appropriate values during a step 46. During a step 48, the task register (TR) is initialized with the base address of first task state segment 'tss1', and the input/output (I/O) privilege level is set to 3.

Figure 3B:
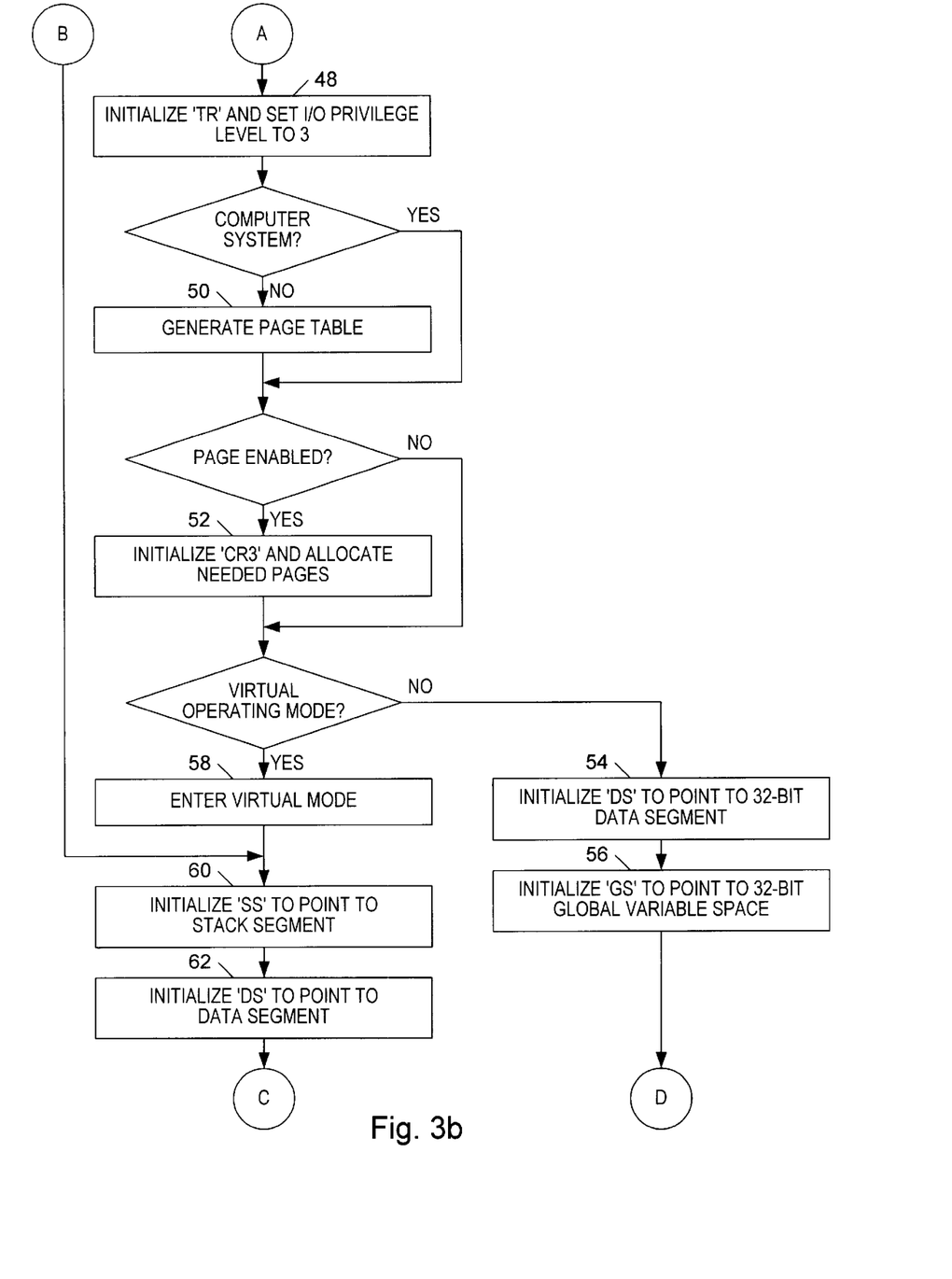

If test code file 22 is produced for execution by the simulation system, a page table is generated during a step 50. If test code file 22 is produced for execution by the computer system, step 50 is not performed and a page table is not generated. If the command line option specifies that paging is to be enabled, control register 3 (CR3) of the x86 microprocessor under test is initialized for paging and needed pages are allocated during a step 52.

If the command line option does not specify operation of the x86 microprocessor in the virtual operating mode:
1) the 'DS' register is initialized to point to a defined 32-bit data memory segment during a step 54, and
2) the 'GS' register is initialized to point to a defined 32-bit global variable space during a step 56.

Figure 3C:
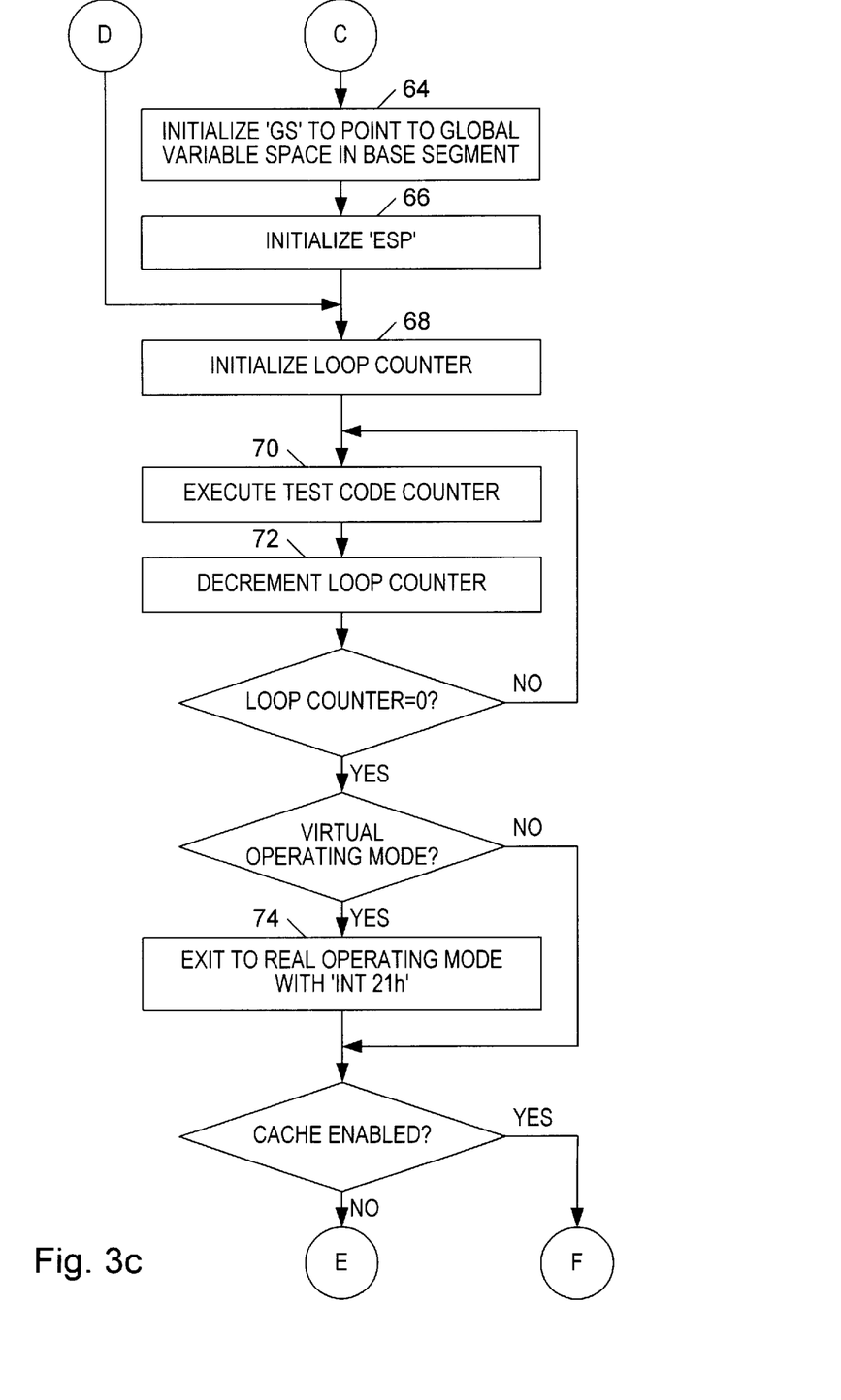

If the command line option specifies operation in the virtual operating mode, the virtual operating mode is entered during a step 58. For operation in the real or virtual operating modes:
1) the 'SS' register is initialized to point to the 'stack' memory segment during a step 60,
2) the 'DS' register is initialized to point to the 'data' memory segment during a step 62,
3) the 'GS' segment register is initialized to point to the global variable space in the 'base' memory segment during a step 64, and
4) the 'ESP' register is initialized to point to the top of the empty stack memory structure in the 'stack' memory segment during a step 66.

During a step 68, a loop counter which determines the number of times a test code module (i.e., the user code portion) is initialized. The test code module is executed during a step 70. As described above, instructions within the test code module cause the x86 microprocessor under test to perform a desired activity and to produce a test result. The test result may be compared to the expected test result during execution of the instructions of the test code module or saved to the memory system for later comparison to the expected test result. During a step 72, the loop counter is decremented. If the loop counter is greater than 0, steps 70 and 72 are repeated.

If the x86 microprocessor under test is operating in the virtual operating mode, a software interrupt 'int 21h' instruction is executed during a step 74 which causes the x86 microprocessor under test to exit the virtual operating mode and to enter the real operating mode. If the cache is not enabled and test code file 22 is produced for execution on the computer system, the modified contents of the cache are written to the memory system and the contents of the cache are invalidated via execution of an x86 'wbinvd' instruction during a step 76. The cache is then enabled during a step 78. If the cache is not enabled and test code file 22 is produced for execution on the simulation system, the cache is simply enabled during step 78. If the cache is enabled and the file is test code file 22 for execution on the computer system, the modified contents of the cache are written to the memory system and the contents of the cache are invalidated via execution of an x86 'wbinvd' instruction during a step 80. If the cache is enabled and test code file 22 is produced for execution on the simulation system, the cache simply remains enabled.

Figure 3D:
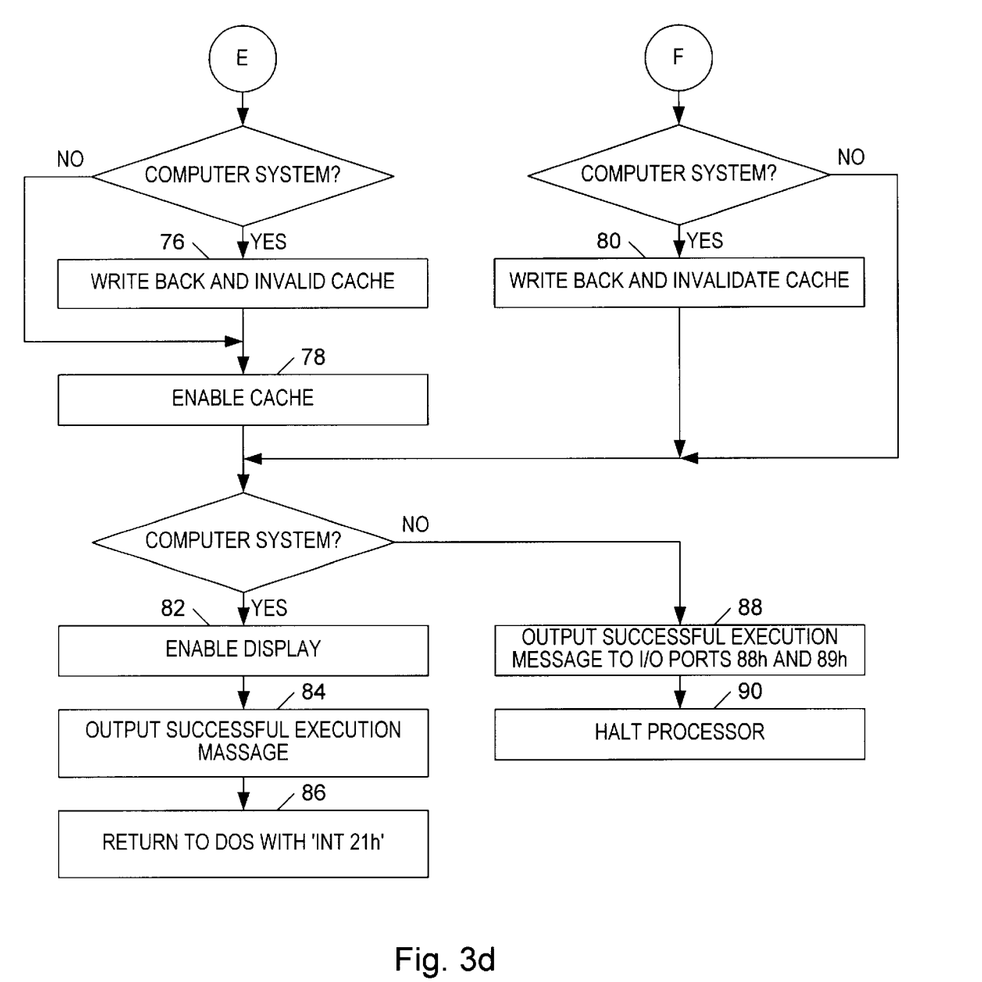

When test code file 22 is executed by the computer system, a display system of the computer system is enabled during a step 82. The display system includes a display device coupled to the x86 microprocessor under test. During a step 84, the x86 microprocessor under test provides a successful test program execution message to the display device. Execution of an 'int 21h' instruction during step 84 causes the x86 microprocessor under test to stop executing instructions of test code file 22. Control of the computer system is returned to the disk operating system (DOS).

When test code 22 is executed by the simulation system, the x86 microprocessor under test writes a successful test program execution message to I/O ports 88h and 89h during a step 88. During a step 90, the x86 microprocessor under test executes a 'halt' instruction which halts instruction execution.

If the test result produced by the x86 microprocessor under test was not compared to the expected test result during test program execution, the test result is stored within the memory system. In this case, the test result is retrieved from the memory system following test program completion and compared to the expected test result in order to determine proper operation of the microprocessor.

It will be appreciated by those skilled in the art having the benefit of this disclosure that this invention is believed to be a method of generating functional tests for a microprocessor having several operating modes and features. Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. A method of determining the proper operation of a microprocessor having a plurality of operating modes and features, comprising:

providing a test module template file having setup and completion code portions and a user code portion, wherein each portion of the test module template file comprises a plurality of software instructions;

copying the test module template file in order to form a test module template file copy;

modifying the test module template file copy in order to form a test module file, wherein the setup and completion code portions are modified in order to configure the microprocessor to operate in any one of the plurality of operating modes and with any of the plurality of features enabled, and the user code portion is modified in order to cause the microprocessor to perform a desired activity and to produce a test result;

determining an expected test result produced by the desired activity using a functional specification of the microprocessor; and comparing the test result to the expected test result in order to determine proper operation of the microprocessor.

2. The method as recited in claim 1, wherein the software instructions of the test module template file include assembly language instructions and assembler directives.

3. The method as recited in claim 1, wherein the step of modifying the test module template file is accomplished by adding, modifying, or deleting software instructions.

4. The method as recited in claim 1, further comprising the steps of:

assembling the test module file to produce a test code file for execution on a simulation system, wherein the test code file includes a plurality of machine language instructions; and executing the test code file on the simulation system by providing a command line to the simulation system, wherein the command line includes a name of the test code file and a command line option, and wherein the command line option specifies the operating mode of the microprocessor to be established during execution and any features to be enabled during execution;

wherein the assembling and executing steps follow the determining step.

5. The method as recited in claim 4, wherein the step of assembling the test module file is accomplished using an assembler.

6. The method as recited in claim 4, wherein during the step of assembling the test module file, the contents of one or more library files are copied into the test module file in place of one or more corresponding assembler directives within the test module file.

7. A method of determining the proper operation of a microprocessor having a plurality of operating modes and features, comprising:

providing a test module template file having setup and completion code portions and a user code portion, wherein each portion of the test module template file comprises a plurality of software instructions;

copying the test module template file in order to form a test module template file copy;

selecting a desired activity to be performed by the microprocessor, wherein the desired activity produces a test result;

determining an expected test result produced by the desired activity using a functional specification of the microprocessor;

modifying the test module template file copy in order to form a test module file, wherein the setup and completion code portions are modified to configure the microprocessor to operate in any one of the plurality of operating modes and with any of the plurality of features enabled, and wherein the user code portion is modified in order to cause the microprocessor to perform a desired activity, to produce a test result, to compare the test result to the expected test result, and to produce a message indicative of the result of the comparison;

assembling the test module file to produce a test code file for execution on a simulation system, wherein the test code file includes a plurality of machine language instructions;

executing the test code file on the simulation system by providing a command line to the simulation system, wherein the command line includes a name of the test code file and a command line option, and wherein the command line option specifies the operating mode of the microprocessor to be established during execution and any features to be enabled during execution; and evaluating the message in order to determine proper operation of the microprocessor.

8. The method as recited in claim 7, wherein the software instructions of the test module template file include assembly language instructions and assembler directives.

9. The method as recited in claim 7, wherein the step of modifying the test module template file is accomplished by adding, modifying, or deleting software instructions.

10. The method as recited in claim 7, wherein the step of assembling the test module file is accomplished using an assembler.

11. The method as recited in claim 7, wherein during the step of assembling the test module file, the contents of one or more library files are copied into the test module file in place of one or more corresponding assembler directives within the test module file.

12. A method of determining the proper operation of a microprocessor having a plurality of operating modes and features, comprising:

providing a test module template file having setup and completion code portions and a user code portion, wherein each portion of the test module template file comprises a plurality of software instructions;

copying the test module template file in order to form a test module template file copy;

modifying the test module template file copy in order to form a test module file, wherein the first and completion code portions are modified in order to configure the microprocessor to operate in any one of the plurality of operating modes and with any of the plurality of features enabled, and wherein the user code portion is modified in order to cause the microprocessor to perform a desired activity and to produce a test result;

determining an expected test result produced by the desired activity using a functional specification of the microprocessor;

assembling the test module file to produce a test code file for execution on a computer system, wherein the test code file includes a plurality of machine language instructions;

executing the test code file on the computer system by providing a command line to the computer system, wherein the command line includes a name of the test code file and a command line option, and wherein the command line option specifies the operating mode of the microprocessor to be established during execution and any features to be enabled during execution; and comparing the test result to the expected test result in order to determine proper operation of the microprocessor.

13. The method as recited in claim 12, wherein the software instructions of the test module template file include assembly language instructions and assembler directives.

14. The method as recited in claim 12, wherein the step of modifying the test module template file is accomplished by adding, modifying, or deleting software instructions.

15. The method as recited in claim 12, wherein the step of assembling the test module file is accomplished using an assembler.

16. The method as recited in claim 12, wherein during the step of assembling the test module file, the contents of one or more library files are copied into the test module file in place of one or more corresponding assembler directives within the test module file.

17. A method of determining the proper operation of a microprocessor having a plurality of operating modes and features, comprising:

providing a test module template file having setup and completion code portions and a user code portion, wherein each portion of the test module template file comprises a plurality of software instructions;

copying the test module template file in order to form a test module template file copy;

selecting a desired activity to be performed by the microprocessor, wherein the desired activity produces a test result;

determining an expected test result produced by the desired activity using a functional specification of the microprocessor;

modifying the test module template file copy in order to form a test module file, wherein the setup and completion code portions are modified to configure the microprocessor to operate in any one of the plurality of operating modes and with any of the plurality of features enabled, and wherein the user code portion is modified in order to cause the microprocessor to perform a desired activity, to produce a test result, to compare the test result to the expected test result, and to produce a message indicative of the result of the comparison;

assembling the test module file to produce a test code file for execution on a computer system, wherein the test code file includes a plurality of machine language instructions;

executing the test code file on the computer system by providing a command line to the computer system, wherein the command line includes a name of the test code file and a command line option, and wherein the command line option specifies the operating mode of the microprocessor to be established during execution and any features to be enabled during execution; and evaluating the message in order to determine proper operation of the microprocessor.

18. The method as recited in claim 17, wherein the software instructions of the test module template file include assembly language instructions and assembler directives.

19. The method as recited in claim 17, wherein the step of modifying the test module template file is accomplished by adding, modifying, or deleting software instructions.

20. The method as recited in claim 17, wherein the step of assembling the test module file is accomplished using an assembler.

21. The method as recited in claim 17, wherein during the step of assembling the test module file, the contents of one or more library files are copied into the test module file in place of one or more corresponding assembler directives within the test module file.

* * * * *